United States Patent [19]

Yoshida

[11] Patent Number: 4,545,198

[45] Date of Patent: Oct. 8, 1985

[54] GAS TURBINE ENGINE CONTROL SYSTEM

[75] Inventor: Kenichi Yoshida, Yokosuka, Japan

[73] Assignee: Nissan Motor Company, Limited, Yokohama, Japan

[21] Appl. No.: 521,269

[22] Filed: Aug. 8, 1983

[30] Foreign Application Priority Data

| Aug. 10, 1982 | [JP] | Japan | 57-137916 |
| Aug. 10, 1982 | [JP] | Japan | 57-137917 |
| Aug. 10, 1982 | [JP] | Japan | 57-120561[U] |
| Aug. 10, 1982 | [JP] | Japan | 57-120562[U] |
| Dec. 14, 1982 | [JP] | Japan | 57-217730 |
| Dec. 28, 1982 | [JP] | Japan | 57-227645 |

[51] Int. Cl.⁴ .............................................. F02C 9/28
[52] U.S. Cl. ................................. 60/39.25; 60/39.281
[58] Field of Search .............. 60/39.281, 39.161, 39.25

[56] References Cited

U.S. PATENT DOCUMENTS

| 2,926,524 | 3/1960 | Sanders . | |
| 3,867,717 | 2/1975 | Moehring et al. | 60/39.281 |
| 3,868,625 | 2/1975 | Speigner et al. | 60/39.281 |
| 3,938,321 | 2/1976 | David et al. . | |
| 4,040,250 | 8/1977 | Saunders et al. | 60/39.281 |
| 4,052,843 | 10/1977 | Takizawa | 60/39.281 |
| 4,058,975 | 11/1977 | Gilbert et al. | 60/39.281 |
| 4,060,979 | 12/1977 | Elsaesser et al. | 60/39.281 |
| 4,449,360 | 5/1984 | Evans | 60/39.281 |

FOREIGN PATENT DOCUMENTS 1452487 10/1976 United Kingdom .

Primary Examiner—Louis J. Casaregola
Attorney, Agent, or Firm—Schwartz, Jeffery, Schwaab, Mack, Blumenthal & Evans

[57] ABSTRACT

An apparatus for controlling a gas turbine engine. A control device is provided for controlling the energy conversion function of the engine. Adjustments of the control device are obtained by comparing an actual value of a condition of the engine with a demand value of the engine condition to produce an error between the actual and demand values and calculating a value corresponding to a setting of the control device to reduce the error to zero. A surge detector generates a surge detection signal when engine surge intensity exceeds a reference level. The engine condition demand value is modified based upon the surge detection signal to suppress the engine surge.

26 Claims, 11 Drawing Figures

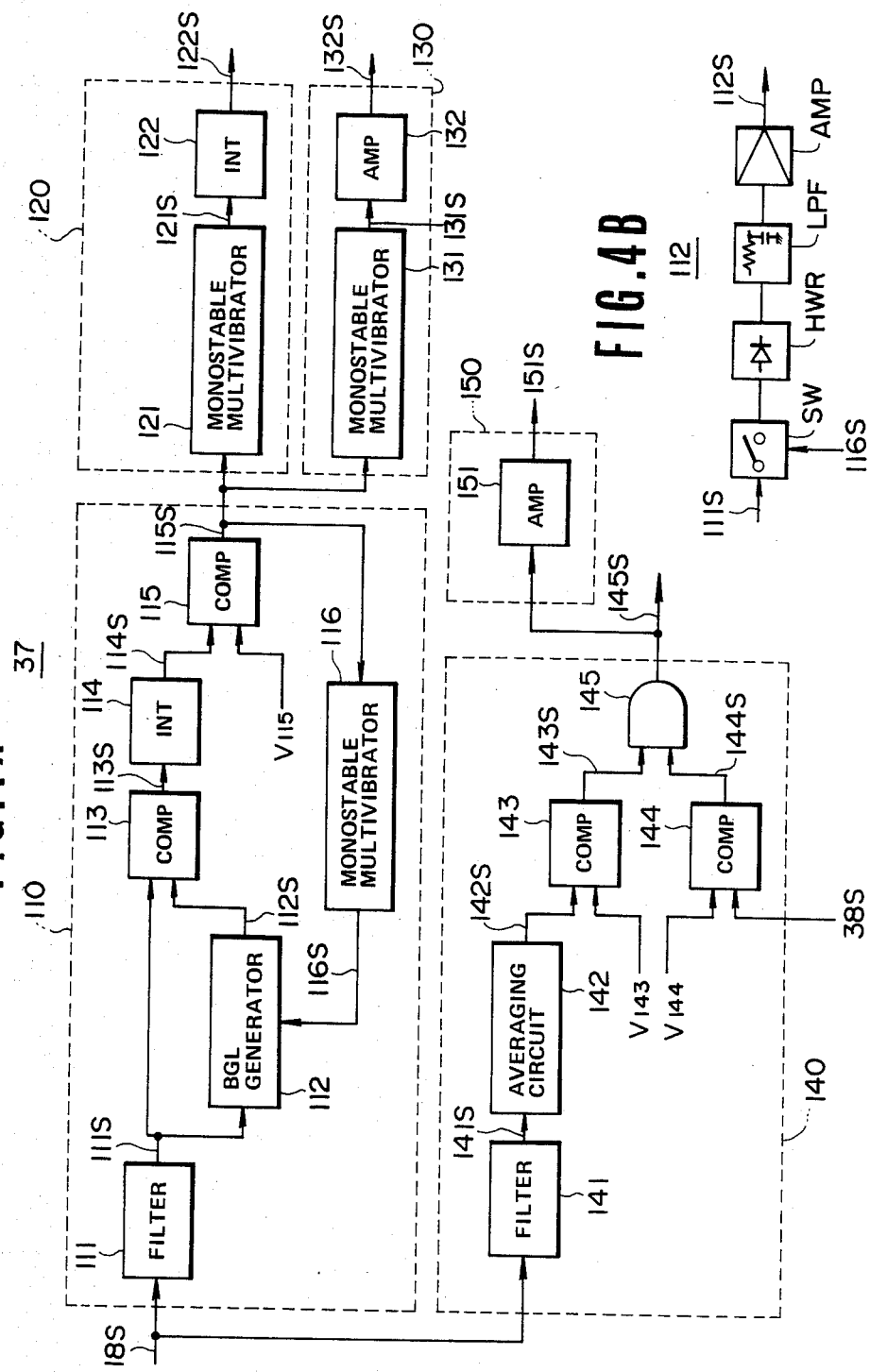

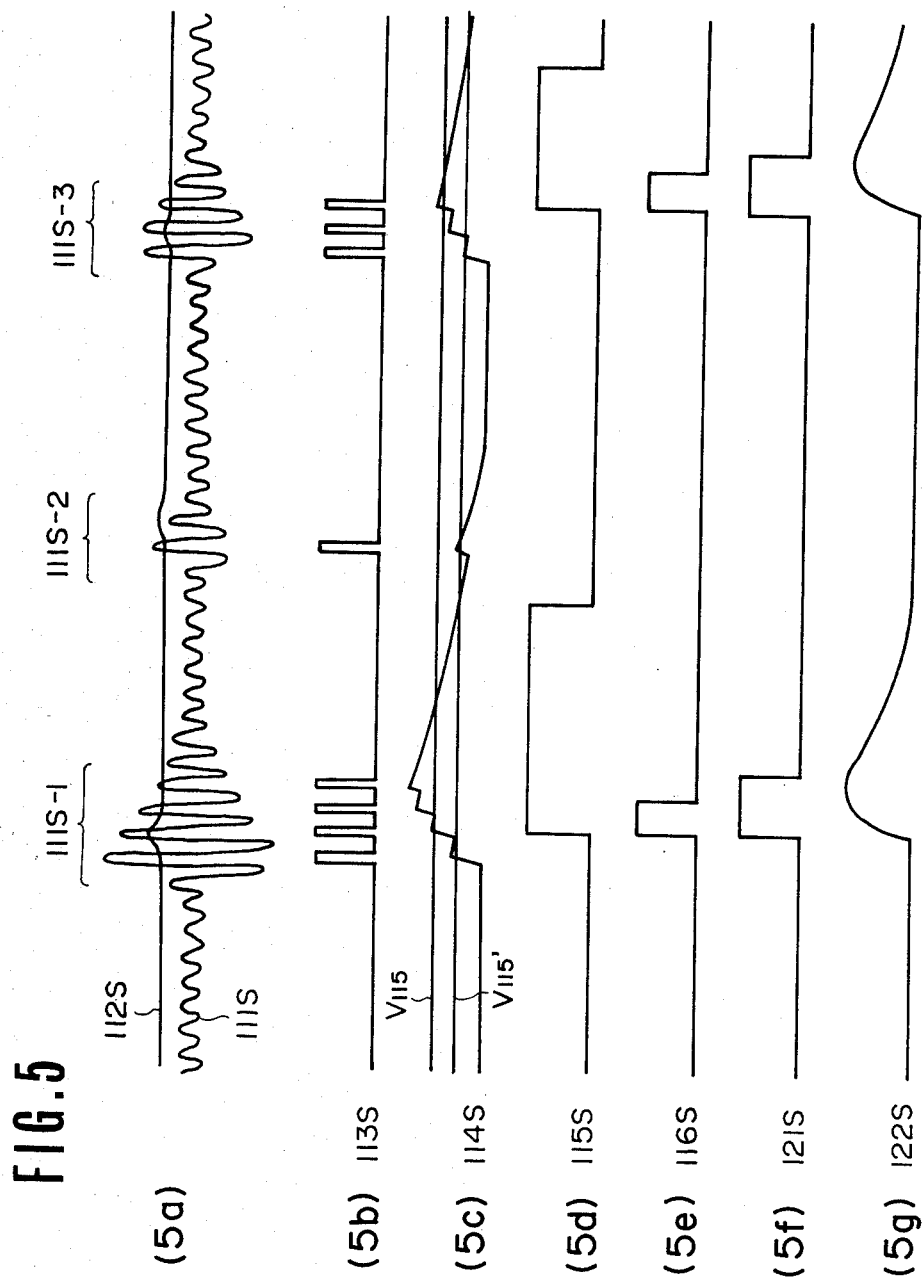

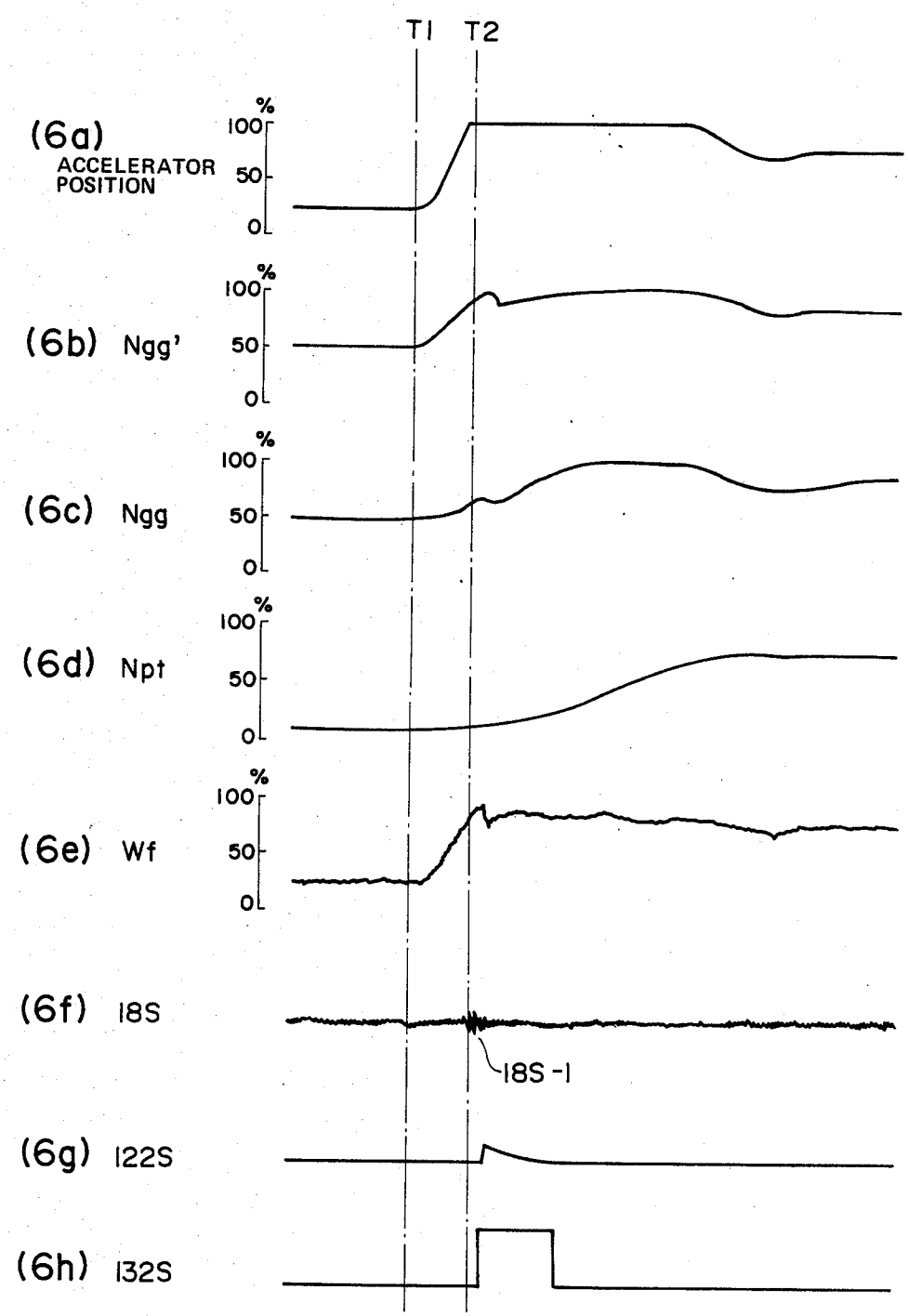

GAS TURBINE ENGINE CONTROL SYSTEM

BACKGROUND OF THE INVENTION

This invention relates to a gas turbine engine including a gas turbine gas generator and a separate power turbine driven by the gas generator for use in a process of converting heat energy released by fuel combustion into mechanical energy and, more particularly, to an apparatus for controlling the energy conversion function of the gas turbine engine to permit the engine to run without engine surge.

Gas turbine engines have been used in automotive vehicles for converting heat energy released by the combustion of fuel into mechanical energy. One serious problem which exists with such gas turbine engines, particularly with two-axle gas turbine engines, is that engine surge occurs with noise and vibration upon the simultaneous occurrence of two conditions; namely, when the amount of air flow through the compressor is within a particular range and when the ratio of pressures at the inlet and outlet of the compressor is within a particular range. Under a surge condition, the gas turbine engine does not run in the most efficient manner and sometimes ceases to run at all. To obtain the maximum performance from a gas turbine engine, however, it is desirable to run the engine quite close to its surge level. Thus, the need exists for a practical approach which overcomes this dilemma by controlling the engine as close to its surge level as possible while avoiding engine surge.

In order to avoid engine surge, it has been attempted to limit values calculated from sensed engine operating conditions for setting a device used to control the energy conversion function of the engine within a predetermined range. With such attempts, however, it is required to provide a large margin at the limitation range so as to avoid engine surge over the entire mode of engine operation, at the sacrifice of acceleration performance and other engine performances. In addition, because of engine characteristic changes with the passage of time and clogging of the engine air passage, the margin determined upon designing the engine will be insufficient to avoid engine surge over the entire engine operation range.

Another problem occurs with gas turbine engines having a closed loop system for feedback control of the speed of rotation of the gas generator. The gas generator speed tends to decrease when engine surge exists. Under a surge condition, the closed loop system will attempt to correct the gas generator speed by supplying more fuel to the engine, causing the engine surge to be accelerated.

Therefore, the present invention provides a gas turbine control apparatus which permits a gas turbine engine to run quite close to its surge level while avoiding engine surge, thereby achieving high engine efficiency and high acceleration performance without degrading driving feel.

SUMMARY OF THE INVENTION

There is provided, in accordance with the present invention, an apparatus for controlling a gas turbine engine used in a process of converting heat energy, released by the combustion of fuel, into mechanical energy. The engine has a gas turbine gas generator including a compressor turbine and a separate power turbine driven by the gas generator. The engine also includes at least one means for controlling the energy conversion process and includes a surge sensor sensing the intensity of engine surge. The apparatus includes an actual signal generator for generating an electrical actual signal indicative of an actual value of a condition of the engine and a demand signal generator for generating an electrical demand signal indicative of a demand value of the engine condition. The actual signal is compared with the demand signal to generate an error signal indicative of the difference between the actual and demand values. Means is provided for calculating a value corresponding to a setting of the means for controlling the energy conversion process to reduce the error signal to zero. A surge detecting circuit generates a surge detection signal when the sensed surge intensity exceeds a reference value. The engine condition demand value is modified based upon the surge detection signal to suppress the engine surge.

Preferably, the surge detecting circuit includes means for reducing the background noise level for a predetermined time period after the surge detection signal occurs. Means may be provided for providing an indication that the engine condition demand value is modified based upon the surge detection signal. The modification of the engine condition may be obtained by subtracting, from the engine condition demand value, a value that increases at a high rate to a predetermined value and then decreases to its initial value at a low rate.

Preferably, means are provided for detecting a failure in the surge sensor and modifying the engine condition demand signal to avoid engine surge regardless of engine operating conditions when the surge sensor is subject to failure. A light or sound indication may be made in response to the failure in the surge sensor.

BRIEF DESCRIPTION OF THE DRAWINGS

The details as well as other features and advantages of this invention are set forth below and are shown in the accompanying drawings, in which:

FIG. 4A is a block diagram showing the detailed structure of the surge control circuit of FIG. 3A;

FIG. 4B is a schematic block diagram showing the detailed structure of the BGL generator of FIG. 4A;

FIG. 5 contains seven waveforms 5a to 5g obtained at various points in the schematic diagram of FIG. 4A;

FIG. 6 contains seven waveforms 6a to 6g obtained at various points in the schematic diagram of FIG. 3A;

DESCRIPTION OF THE PREFERRED EMBODIMENTS

In the following description, the method and apparatus of the invention are embodied in an engine control system as applied to a two-axle gas turbine engine including a gas turbine gas generator and a separate power turbine driven by the gas generator. The controlled variables, that is, the adjustable variables selected to control or determine the characteristics of the engine's energy conversion process, are the amount of fuel metered to the engine and/or the position of a variable nozzle regulating the gas flow from the gas generator to the power turbine. Means are provided for adjusting or setting each of these controlled variables. These controlled variables are adjusted while the engine is operative in effecting the conversion of heat energy released by the combustion of fuel into mechanical energy. A control unit is employed to determine values corresponding to settings of the controlled variables.

In this embodiment of the invention, the controlled variable fuel supply amount, which determines the speed of rotation of the gas generator, is related to an operator's demand for the gas generator speed and is modified based upon a feedback signal indicative of the sensed condition of the gas generator speed. The controlled variable nozzle position, which determines the temperature at the inlet of the compressor turbine, is related to a demand for the compressor turbine inlet temperature and is modified based upon a feedback signal indicative of the sensed condition of the compressor turbine inlet temperature. The compressor turbine inlet temperature demand is calculated by the control unit based upon the sensed conditions of the gas generator speed and the intake air temperature. The control circuit employs a surge detection circuit which is sensitive to a surge condition for modifying the demand for the setting of the controlled variable so as to avoid the engine surge.

Figure 1:
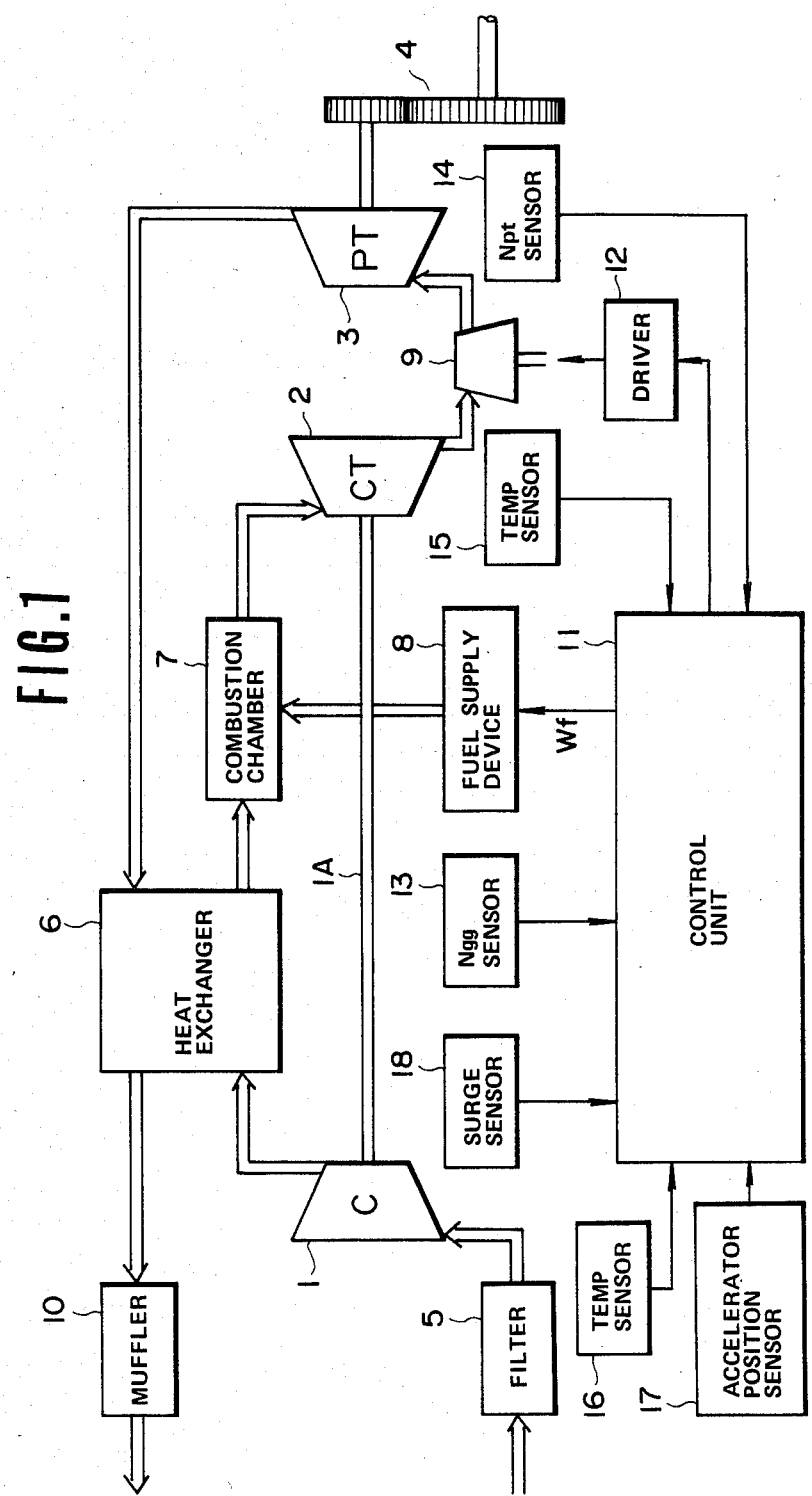
FIG. 1 is a schematic block diagram showing a control system for controlling a gas turbine engine in accordance with the teachings of the present invention.

With reference to the drawings, wherein like numerals refer to like parts in the several views, and in particular to FIG. 1, there is shown a schematic block diagram of a gas turbine engine control system embodying the method and apparatus of the invention. The gas turbine engine is illustrated as a regenerated, two-axle gas turbine engine which includes a compressor 1 secured on a gas generator shaft 1A having a compressor turbine secured thereon, and a power turbine 3 coupled through a reduction gearing 4 to a propeller shaft which in turn is coupled to the automobile road wheels through a transmission (not shown).

Air for the gas generator is supplied to the compressor 1 through an air filter 5 which prevents any contaminants from reaching the compressor 1. The pressurized air from the compressor 1 is conducted through a heat exchanger 6 to a combustion chamber. Fuel is supplied from a fuel supply device 8 into the combustion chamber 7 where it burns in the presence of heated air delivered thereinto through the heat exchanger 6. The products or gases resulting from the combustion of the air-fuel mixture in the combustion chamber 7 drive the compressor turbine 2 and then are supplied through a variable nozzle 9 to develop a fluid drive effect on the power turbine 3. The exhaust from the power turbine 3 is conducted into the heat exchanger 6, in which heat is transferred therefrom to the air passing the heat exchanger to the combustion chamber 7, and hence through a muffler 10 to the atmosphere.

The fuel supply device 8 serves to control the fuel to the combustion chamber 7 in order to develop the necessary power for driving the power turbine 3. The fuel supply device may comprise a fuel injector responsive to electrical pulses for injecting fuel in amounts determined by the width of the electrical pulses.

The position of the variable nozzle 9 is varied by a nozzle driver 12 to increase or decrease the cross-sectional area of the gas passage connected between the compressor turbine 2 and the power turbine 3. The smaller gas passage cross-sectional area, the higher the temperature at the inlet of the compressor turbine 2. The tendency toward engine surge is quite dependent upon the compressor turbine inlet temperature and thus the gas passage cross-sectional area. The tendency toward engine surge increases as the gas passage cross-sectional area decreases. The nozzle driver 12 may comprises an electro-hydraulic servo valve, a hydraulic cylinder, a hydraulic pump and a link mechanism connected to the variable nozzle 9 in the conventional manner.

A suitable speed transducer 13 senses the speed of rotation of the gas generator (Ngg) and converts it to a signal having a frequency proportional thereto which is applied to the control unit 11. Another speed transducer 14 senses the speed of rotation of the power turbine (Npt) and converts it to a signal of a frequency proportional thereto which is applied to the control unit 11. A temperature sensor 15 senses the temperature at the inlet of the compressor turbine 2 (Tcc) and converts it to an analog signal having a magnitude proportional thereto which is applied to the control unit 11. Another temperature sensor 16 senses the temperature at the inlet of the compressor 1 and converts it to an analog signal having a magnitude proportional thereto which is applied to the control unit 11. An accelerator pedal position sensor 17 senses the degree of depression of an accelerator pedal actuated by an operator and converts it to an analog signal having a magnitude proportional thereto which is applied to the control unit 11.

A surge sensor 18 senses the pressure at the inlet of the compressor 1, or the pressure at the outlet of the compressor 1, or the pressure differential between the inlet and outlet of the compressor and generates a surge sensor signal indicative of the intensity of engine surge. The surge sensor utilizes the fact that great fluctuations occur in the pressure differential between the inlet and outlet of the compressor 1 under or near an engine surge condition.

The control circuit 11 controls the speed of rotation of the gas generator by adjusting the amount of fuel to the gas generator. The cotrol circuit 11 determines a gas generator speed demand value from the degree of depression of the accelerator pedal, calculates the amount of fuel to the gas generator, and drives the fuel supply device 8 including a fuel injection valve to supply the calculated amount of fuel to the combustion chamber 7. The control circuit 11 includes a closed loop system for feedback control of the gas generator speed to the determined speed demand value.

The control circuit 11 also controls the temperature at the inlet of the compressor turbine 2 by adjusting the degree of opening of the variable nozzle 9. The control circuit 11 determines a temperature demand value optimum to obtain the maximum performance at the sensed gas generator speed, calculates a nozzle position value based upon the determined temperature demand value, and drives the variable nozzle 9 to the calculated position. The control circuit 11 includes a closed loop system for feedback control of the temperature at the inlet of the compressor turbine to the demand value.

The control circuit 11 is responsive to the sensed surge intensity to avoid the surge by controlling the amount of fuel to the gas generator, the degree of opening of the variable nozzle 9, or other controlled-variables.

Figure 2:
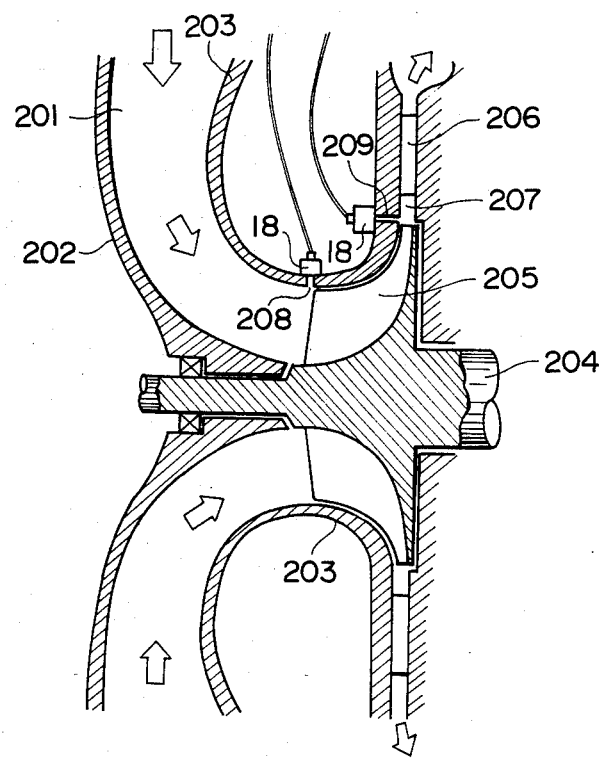
FIG. 2 is a fragmentary enlarged sectional view showing the detailed structure of the compressor of the gas turbine engine.

Referring to FIG. 2, which illustrates the compressor 1 in greater detail, there is defined, between a casing 202 and a shroud 203, an air passage 201 in which an impeller 205 is secured on a shaft 204. A vane diffuser 206 is disposed in the air passage downstream of the impeller 205. A small hole 208 is formed which extends through the shroud 203 and opens into the air passage 201 near the inlet side of the impeller 205. The surge sensor 18 is positioned on the shroud 203 at the side opposite to the impeller 205 to cover the small hole 208. The surge sensor 18 senses the static pressure in the air passage 201 near the inlet side of the impeller 205. Alternatively, the surge sensor 18 may be positioned on the shroud 203 at the side opposite to the impeller 205 to cover a small hole 209 which extends through the shroud 203 and opens into the air passage 207 between the impeller 205 and the vane diffuser 206 so as to sense the static pressure in the air passage 207 near the outlet side of the impeller 205. The surge sensor 18 has a response time as fast as 1 to 10 msec. and a toughness to tolerate pressure shock or impact produced when engine surge occurs.

Referring again to FIG. 1, the control unit 11 calculates optimum values of settings of the fuel supply device 8 and the nozzle driver 12 and provides control signals thereto. The control unit 11 also provides a command signal to an indication device 19 (FIG. 3A) which thereby gives a light or sound indication to an engine operator whenever engine surge is detected and a command signal to another indication device 20 (FIG. 3A) which thereby gives a light or sound indication to the operator whenever a failure occurs in the surge sensor 18.

Figures 3A, 3B:
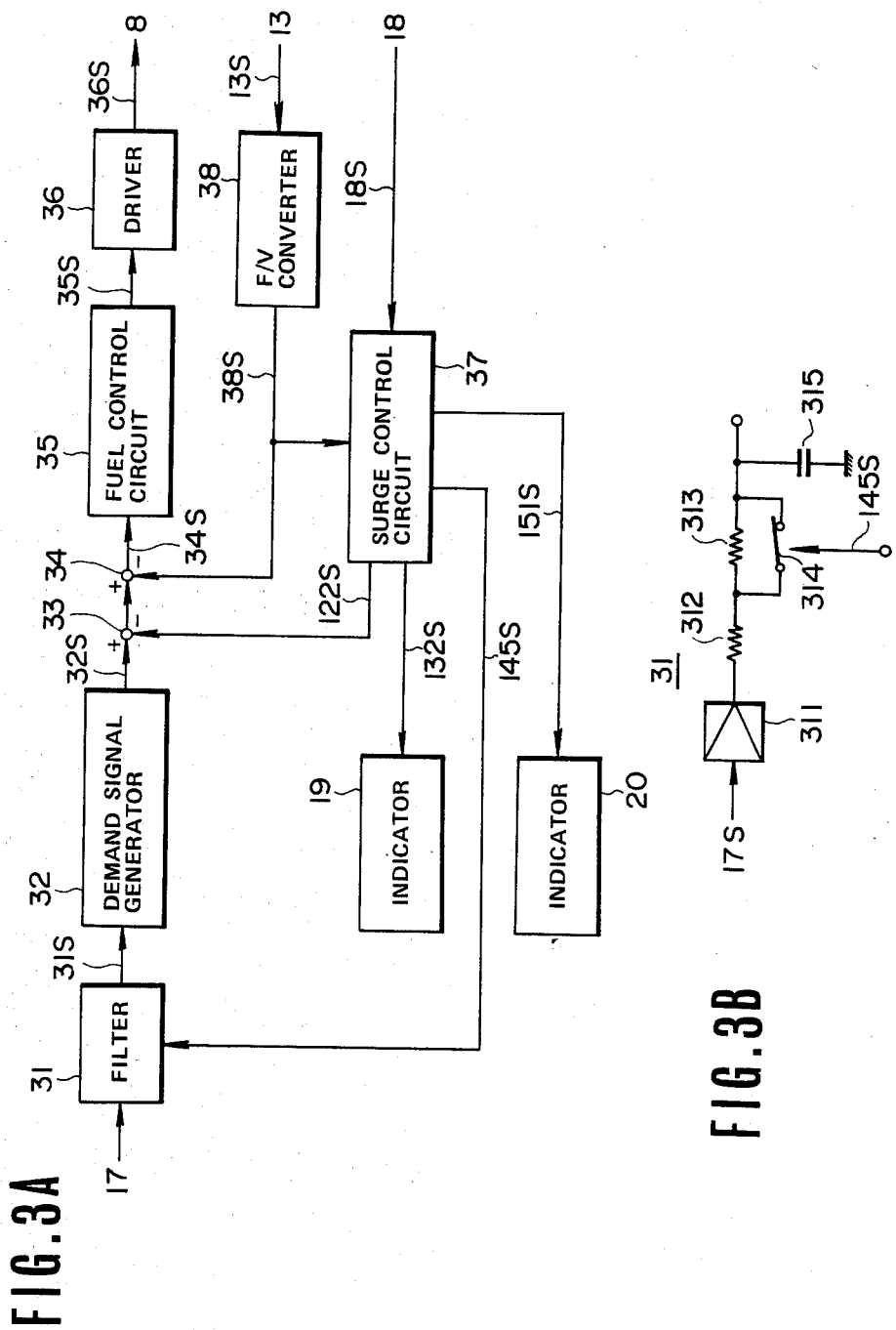
FIG. 3A is a block diagram of a control in accordance with the invention.
FIG. 3B is a circuit diagram showing the detailed structure of the low-pass filter of FIG. 3A.

Referring to FIG. 3A, the control circuit 11 includes a low-pass filter 31 through which the accelerator pedal depression indication signal 17S is delivered to a gas generator speed demand signal (SDS) generator 32. The low-pass filter 31 includes an RC integrator to delay the application of the accelerator pedal depression indication signal 17S to the gas generator speed demand signal generator 32 so as to limit the demand for acceleration of the gas generator.

As can be seen in FIG. 3B, the low-pass filter 31 comprises a buffer amplifier 311 which receives the accelerator pedal depression indication signal 17S. The output of the buffer amplifier 311 is connected through a series circuit of resistors 312 and 313 to one terminal of a capacitor 315, the other terminal of which is grounded. The resistor 313 is connected in parallel with an analog switch 314 which is normally closed to provide the RC integrator with a first time constant α given by $$\alpha = R1 \cdot C$$

wherein R1 is the resistance value of the resistor 313 and C is the capacitance value of the capacitor 315.

In response to a failure indication signal 145S from a surge control circuit 37 to be described later, the analog switch 314 opens to provide the RC integrator with a second, greater time constant β given by $$\beta = (R1 + R2) \cdot C$$

wherein R2 is the resistance value of the resistor 311. As a result, the low-pass filter 31 further limits the demand for gas generator acceleration so as to avoid engine surge over the entire range of depression of the accelerator pedal when any failure occurs in the surge sensor 18 or the surge control circuit 37.

Returning to FIG. 3A, the gas generator speed demand signal generator 32 includes function generators operable to produce a signal directly proportional to the filtered signal 31S and a signal indicative of a gas generator speed required under idling conditions, and an adder operable to add these two function generator output signals to produce a signal 32S indicative of the required speed of the gas generator. The speed demand signal 32S is applied to a subtractor 33 where it is compared with a surge control signal 122S from the surge control circuit 37 to generate a signal indicative of the difference which is applied to a subtractor 34.

The speed sensor signal 13S from the gas generator speed sensor 13 is delivered to a frequency-to-voltage converter 38. The output of the frequency-to-voltage converter 38 is a voltage signal 38S having a magnitude that is a function of the frequency of the speed sensor signal 13S. The gas generator actual speed indication signal 38S is impressed on the subtractor 34 where it is compared with the signal from the subtractor 33 to generate a signal 34S indicative of the difference (Ngg error).

The Ngg error signal 34S is applied to a fuel control circuit 35 which generates a fuel control signal 35S. The fuel control circuit 35 includes a PID controller which performs proportional, integral and differential operations to generate a PID control signal so as to gradually reduce the Ngg error to zero, and a limiter which limits the PID control signal within limits varying as a predetermined function so as to avoid over temperature and flame blow off in the combustion chamber 7. The fuel control signal 35S is applied to a fuel supply device driver 36 which includes a pulse modulator to convert the fuel control signal 35S into a series of pulses suitable to drive the fuel supply device 8.

The surge control circuit 37 has inputs from the frequency-to-voltage converter 38 and the surge sensor 18. The surge control circuit 37 is responsive to the intensity of the engine surge sensed by the surge sensor 18 to generate a surge control signal 122S to the subtractor 33 and also a surge detection signal 132S to the surge indication device 19 when engine surge is detected. The surge control circuit 37 generates a failure indication signal 145S to the low-pass filter 31 and also a failure detection signal 151S to the failure indication device 20 when any failure occurs in the surge sensor 18.

Referring to FIG. 4A, the surge control circuit 37 includes a surge detection section 110, a function generator section 120, a surge indication section 130, a failure detection section 140, and a failure indication section 150.

The surge detection section 110 includes a filter 111 which receives the surge signal 18S from the surge sensor 18 and filters out unwanted components from the surge sensor signal 18S. The filtered signal 111S varies according to the intensity of the engine surge, as shown in FIG. 5A wherein waveform 111S-1 indicates strong surge, waveform 111S-2 indicates weak surge, and waveform 111S-3 indicates medium surge. The output of the filter 111 is coupled to a comparator 113 and also to a background noise level (BGL) generator 112. The BGL generator 112 rectifies and averages the filtered signal 111S to generate a signal 112S indicative of a background noise level, as shown in FIG. 5a.

As can be seen in FIG. 4B, the BGL generator 112 comprises a series circuit of an analog switch (SW), a half-wave rectifier (HWR), a low-pass filter (LPF), and an amplifier (AMP). The analog switch is normally at its closed position to permit the BGL generator 112 to generate the background noise level indication signal 112S when no engine surge is detected. The analog switch opens to reduce the background noise level indication signal 112S to zero for a predetermined period of time after a surge condition is detected. This is effective to avoid an excessive increase of the background noise level indication signal 112S. In greater detail, the analog switch opens in response to an inhibit signal 116S from a monostable multivibrator 116 which will be described later.

Returning to FIG. 4A, the background noise level indication signal 112S is impressed on the comparator 113 where it is compared with the filtered signal 111S to generate a surge indication signal 113S when the filtered signal 111S is greater than the background noise level indication signal 112S. As shown in FIG. 5b, the surge indication signal 13S contains one or more pulses whose pulse width and pulse number are dependent upon the intensity of the engine surge. For example, the greater the intensity of the engine surge, the longer the pulse width and the greater the pulse number. The surge indication signal 113S is delivered to an integrator 114 whose capacitor is charged by the surge indication signal 113S at a relatively high rate and is discharged at a lower rate so as to generate a signal 114S, as shown in FIG. 5c. The integrated signal 114S is applied to a comparator 115 where it is compared with a signal indicative of a reference level V115, as shown in FIG. 5c, to generate a surge detection signal 115S when the integrated signal 114S is greater than the reference level indication signal. Preferably, the comparator 115 compares the integrated signal hysteretically with a higher reference V115 when the integrated signal 114S is increasing and with a lower reference V115' when the integrated signal is decreasing to generate a surge detection signal 115S, as shown in FIG. 5d. The comparator 115 is effective to ensure accurate engine surge detection with high sensitivity by preventing the surge detection signal 115S being produced when the engine surge is faint or when the integrated signal 114S occurs due to noises other than engine surge. Thus, the surge detection signal 115S is generated when the engine surge has an intensity greater than a predetermined level. The surge detection signal 115S is applied to a monostable multivibrator 116 which is responsive to the leading edge of the surge detection signal 115S to generate an inhibit signal 116S having a predetermined pulse width, causing the BGL generator 112 to stop generating the background noise level indication signal 112S as described previously. The output of the monostable multivibrator 116 is shown in FIG. 5e.

The function generator section 120 includes a monostable multivibrator 121 which receives the surge detection signal 115S from the comparator 115 and generates a signal 121S having a predetermined pulse width in response to the leading edge of the surge detection signal. The signal 121S, which is shown in FIG. 5f, is applied to an integrator 122 whose capacitor is charged by the signal 121S at a relatively high rate and is discharged at lower rate to generate a surge control signal 122S, as shown in FIG. 5g. The surge control signal 122S is applied to the subtractor 33. Thus, the subtractor 33 subtracts, from the gas generator speed demand value, a value that increases at a high rate to a predetermined value and then decreases at a low rate. As a result, the gas generator demand speed indicative signal is rapidly reduced by a predetermined value and then is gradually increased.

The surge indication section 130 includes a monostable multivibrator 131 which receives the surge detection signal 115S from the comparator 115 and generates a signal 131S having a predetermined pulse width corresponding to the time period of occurrence of the surge control signal 122S in response to the leading edge of the surge detection signal 115S. The signal 131S is applied to a power amplifier 132 which amplifies it to generate a surge detection signal 132S. The signal 132S is delivered to the surge indication device 19. The surge indication device 19 has a light emission diode or incandescent lamp which provides a light indication to the engine operator to inform that the gas generator speed demand signal is modified by the surge control signal 122S for the predetermined time after the surge detection signal 115S occurs. The surge indication device 19 may utilize a liquid crystal indicator or a chime, buzzer or other sounding means which is actuated by the signal 132S to give a sound indication. It is to be noted that the monostable multivibrator 131 may receive the surge control signal 122S rather than the surge detection signal 115 to obtain the same effect.

The failure detection section includes a filter 141 which receives the surge sensor signal 18S from the surge sensor 18 and filters out unwanted components from the surge sensor signal 18S. The filtered signal 141S is applied to an averaging circuit 142 which rectifies and averages the filtered signal 141S to generate a signal 142S. The signal 142S is impressed on a comparator 143 where it is compared with a signal indicative of a reference surge level V143. The output of the comparator 143 goes high when the averaged signal 142S is below the reference surge level V143.

The failure detection section also includes a comparator 144 which receives the gas generator actual speed indication signal 38S from the frequency-to-voltage converter 38 and compares it with a reference gas generator speed level V144. The output of the comparator 144 goes high when the gas generator actual speed indication signal 38S is above the reference gas generator speed level V144. The outputs of the comparators 143 and 144 are coupled to an AND gate 145 which generates a failure indication signal 145S when both of the outputs of the comparators 143 and 144 are high.

The reference speed level V144 is determined at a gas generator speed value at which the surge sensor 18 produces a certain output without engine surge. For example, the reference speed level 144 is set at a gas generator speed value somewhat higher than that developed during idling. The reference surge level V143 is determined at a value somewhat lower than the averaged signal 142S generated by the averaging circuit 141 at a gas generator speed corresponding to the reference speed level V144. This permits detection of failure and degradation of the surge sensor 18 regardless of occurrence of the engine surge. It is to be understood, of course, that the failure indication signal 145 occurs when any failure exists in connectors or signal lines from the surge sensor 18. The failure indication signal 145S is applied to the low-pass filter 31 which thereby limits the demand for gas generator acceleration to such a level that engine surge will not normally occur.

The failure indication section 150 comprises a power amplifier 151 which receives the failure indication signal 145S from the AND gate 145 and amplifies it to generate a failure detection signal 151S. The signal 151S is applied to the failure indication device 20. The failure indication device 20 has a light emission diode or incandescent lamp which gives a light indication to the engine operator to inform that a failure occurs in the surge sensor 18 or the associated circuit and that the gas turbine engine is controlled such that engine surge will not normally occur. The failure indication device 20 may utilize a liquid crystal indicator or a chime, buzzer or other sounding means which is actuated by the signal 151S to provide a sound indication.

The operation of the circuit of FIG. 3A can best be understood by reference to FIG. 6. At time T1 the engine operator rapidly depresses the accelerator pedal from a partially depressed position to its fully depressed position, as shown in FIG. 6a, to demand a step change in gas generator speed, the gas generator speed demand signal (Ngg') at the output of the speed demand signal generator 32 thus rises, as shown in FIG. 6b, and there is a corresponding rise in the error signal 34S to cause the fuel control circuit 35 to command more fuel supply, with a resulting increase in the amount of fuel to the engine (wf), as shown in FIG. 6e. With the amount of fuel to the engine increased, there is a rise in the speed of rotation of the gas generator (Ngg), as shown in FIG. 6c, and results in a gradual rise in the speed of rotation of the power turbine (Npt), as shown in FIG. 6d.

It is well known in the art that engine surge occurs often in the course of acceleration of the gas generator and the tendency increases as the rate of acceleration of the gas generator increases. At time T2 a surge condition commences during gas generator acceleration, the surge sensor signal 18S has its magnitude varied greatly, as indicated by 18S-1 in FIG. 6f, and the surge control circuit 37 generates a surge control signal 122, as shown in FIG. 6g, to cause a rapid decrease in the gas generator speed demand signal (Ngg'), as shown in FIG. 6b. As a result, the amount of fuel to the engine (wf) decreases temporarily, as shown in FIG. 6e, to avoid the engine surge.

Upon the generation of the surge control signal 122S, the surge control circuit 37 generates a surge detection signal 132S having a pulse width corresponding to the time period of occurrence of the surge control signal 122S, as shown in FIG. 6h. The surge detection signal 132S is applied to the surge indication device 19 which thereby provides an indication whenever the gas generator speed demand signal is modified by the surge control signal 122S.

Since the surge control circuit 37 has a high sensitivity to detect not only small surges but also foreflow conditions toward engine surges, the engine can be controlled to run without surge or at or close to its faint surge level so as to provide the maximum performance without degrading driving feel. Although a typical engine surge during acceleration is depicted in FIG. 6, it is to be understood that the present invention can control engine surge in the same manner during normal operating conditions.

In addition, the surge control circuit 37 detects a failure in the surge sensor 18 and generates a failure indication signal 145S to limit the demand for gas generator acceleration to such a level that engine surge will not normally occur. This eliminates the possibility of the engine components from being subject to failure due to engine surges during acceleration when the surge control circuit 37 fails to control the engine surges because of a failure in the surge sensor 18. The surge control circuit 37 generates a failure detection signal 151S to the failure indication device 20 which provides an indication whenever the demand for gas generator acceleration is limited to such a level that engine surge will not normally occur.

Figure 7A:
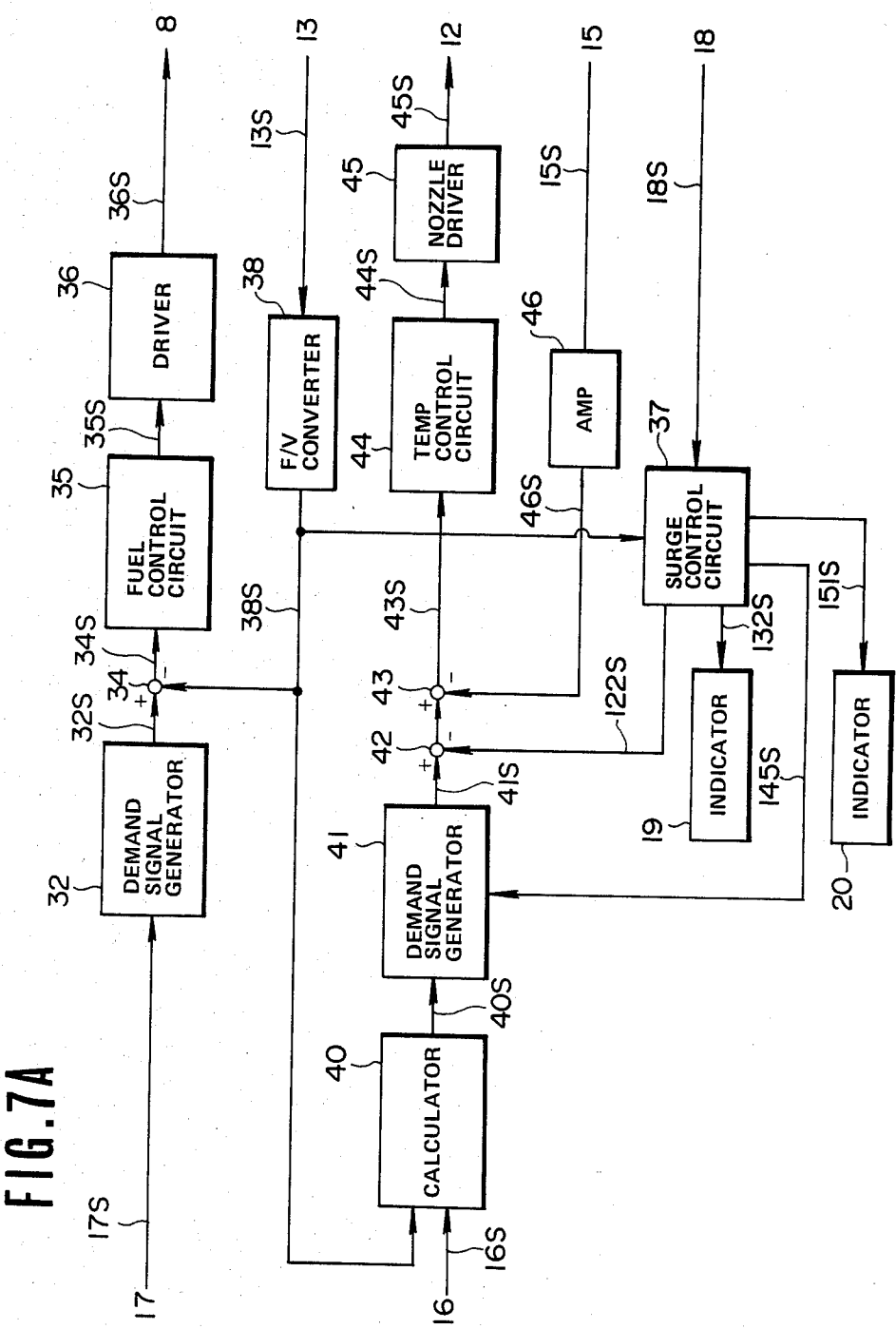
FIG. 7A is a block diagram of a control in accordance with another embodiment of the present invention.

Referring to FIG. 7A, a second embodiment of the control unit of FIG. 1 is illustrated with the same elements being designated by the same reference numerals.

The control circuit 11 includes a gas generator speed demand signal generator 32 which includes function generators operable to produce a signal directly proportional to the accelerator pedal depression indication signal 17S and also a signal indicative of a gas generator speed required under idling conditions, and an adder operable to add these two function generator output signals to produce a signal 32S indicative of the required speed of the gas generator. The speed demand signal 32S is applied to a subtractor 34. The speed sensor signal 13S from the gas generator speed sensor 13 is delivered to a frequency-to-voltage converter 38. The output of the frequency-to-voltage converter 38 is a voltage signal 38S having a magnitude that is a function of the frequency of the speed sensor signal 13S. The gas generator actual speed indication signal 38S is impressed on the subtractor 34 where it is compared with the gas generator speed demand signal 32S to generate a signal 34S indicative of the difference (Ngg error).

The Ngg error signal 34S is applied to a fuel control circuit 35 which generates a fuel control signal 35S. The fuel control circuit 35 includes a PID controller which performs proportional, integral and differential operations to generate a PID signal so as to gradually reduce the Ngg error to zero, and a limiter which limits the PID control signal within limits varying as a predetermined function so as to avoid over temperature and flame blow off in the combustion chamber 7. The fuel control signal 35S is applied to a fuel supply device driver 36 which includes a pulse modulator to convert the fuel control signal 36S to a series of pulses suitable to drive the fuel supply device 8.

The gas generator actual speed indication signal 38S is applied to a calculator circuit 40 and also to a surge control circuit 37. The calculator circuit 40 receives a signal 16S indicative of the air temperature at the inlet side of the compressor 1 and modifies the gas generator actual speed indication signal 38S based upon the signal 16S in accordance with the following equation:

$$Ngg° = \frac{Ngg}{\sqrt{T1/T_{15°C.}}}$$

wherein Ngg is the sensed gas generator speed, Ngg° is the modified gas generator speed, T1 represents the air temperature at the inlet side of the compressor in Kelvin temperature, and $T_{15°C.}$ represent in Kelvin temperature a reference temperature corresponding to 15° C. The modified signal 40S is applied to a temperature demand signal generator 41.

The surge control circuit 37, which is identical to that described in connection with FIGS. 3A, 4A and 4B, detects a surge condition based upon the surge intensity indication signal 18S from the surge sensor 18 to generate a surge control signal 122S to a subtractor 42 and a surge indication signal 132S to the surge indication device 19 and detects a failure in the surge sensor 18 to generate a failure indication signal 145S to the temperature demand signal generator 41 and a failure detection signal 151S to the failure indication device 20.

Figure 7B:
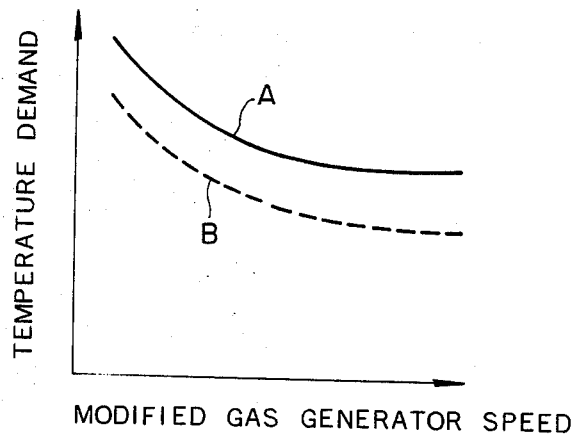
FIG. 7B is a graph of temperature demand and modified gas generator speed.

The temperature demand signal generator 41 generates a temperature demand signal 41S indicative of the temperature required to achieve the maximum performance under the conditions sensed by the sensors 16 and 18. The temperature demand signal generator 41 includes a function generator which generates a temperature demand signal as a function describing a desired relationlship between the demanded temperature and the modified signal, as indicated by the solid curve A in FIG. 7B, when no failure occurs in the surge sensor 18. The temperature demand signal generator 41 is responsive to the failure indication signal 145S from the surge control circuit 37 to reduce the demanded temperature by a predetermined value, as indicated by the broken curve B in FIG. 7B, so as to suppress engine surge regardless of engine operating conditions. The temperature demand signal 41S is applied to a subtractor 42 where it is compared with the surge control signal 122S from the surge control circuit 37 to generate a signal indicative of the difference which is applied to a subtractor 43.

The signal 15S indicative of the air temperature at the inlet side of the compressor turbine 2 is delivered from the temperature sensor 15 to an amplifier 46 which amplifies the temperature sensor signal 15S to generate a turbine inlet air temperature actual signal 46S. The temperature actual signal 46S is impressed on the subtractor 43 where it is compared with the temperature demand signal from the subtractor 42 to generate a signal 43S indicative of the difference (Tcc error).

The Tcc error signal 43S is applied to a temperature control circuit 44 which generates a temperature control signal 44S. The temperature control circuit 44 includes a PID controller which performs proportional, integral and differential operations to generate a PID control signal so as to gradually reduce the Tcc error signal 43S to zero, and a limiter which limits the PID control signal within limits varying as a predetermined function so as to avoid application of a sudden large signal to the nozzle driver 12. The temperature control signal 44S is applied to a nozzle position control circuit 45 which includes a voltage-current converter which converts the temperature control signal 44S into a current signal suitable to electro-hydraulic servo valve and generates a nozzle position control signal 45S to the nozzle driver 12. The nozzle driver 12 comprises an electro-hydraulic servo valve, a hydraulic cylinder, a hydraulic pump, a variable nozzle, and a link mechanism (not shown) to control the position of the variable nozzle in accordance with the nozzle position control signal 45S.

Figure 8:
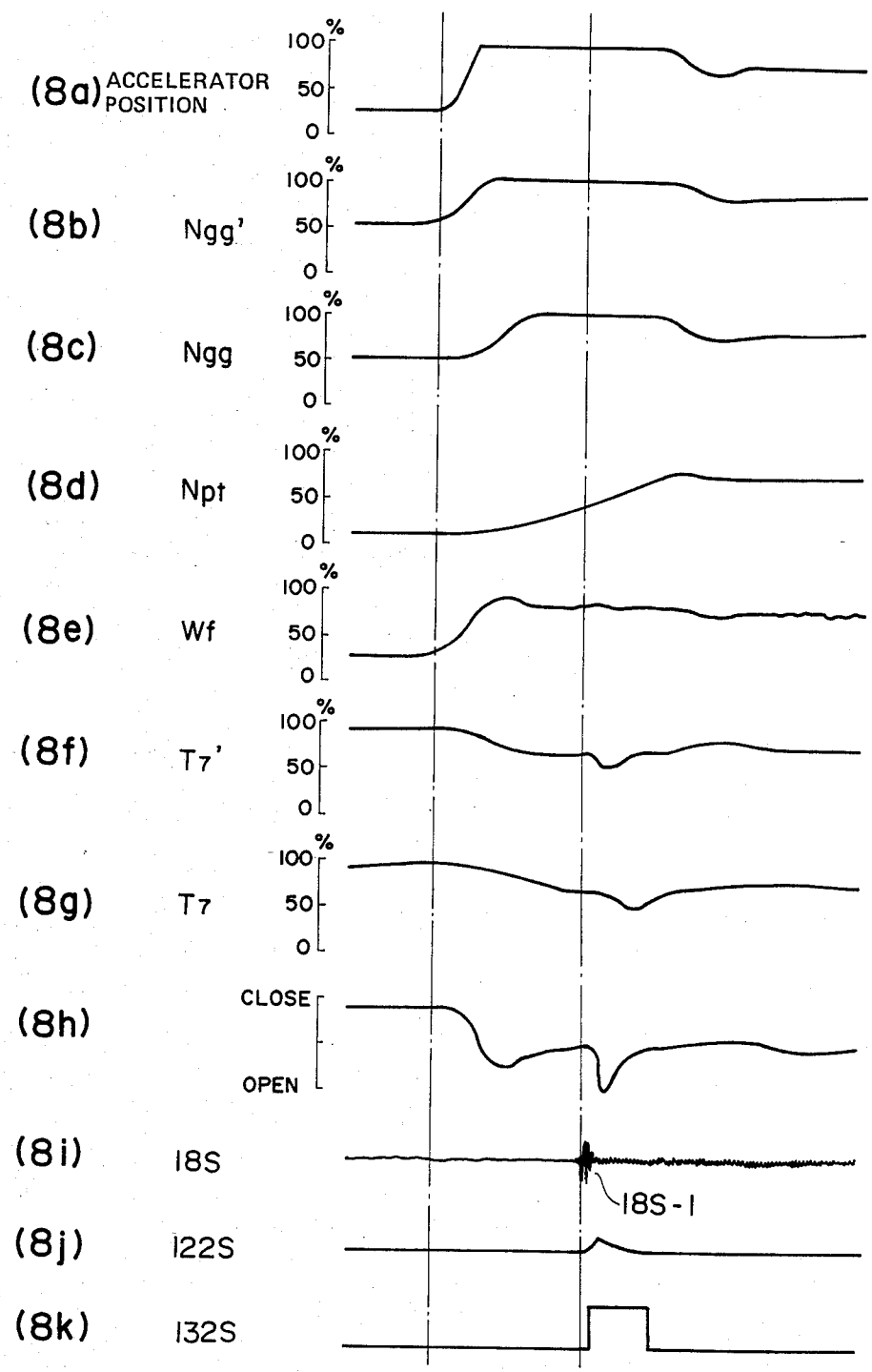
FIG. 8 contains ten waveforms 8a to 8k obtained at various points in the schematic diagram of FIG. 7A.

The operation of the circuit of FIG. 7A can best be understood by reference to FIG. 8 which contains FIGS. 8a to 8k drawn on the same time scale. At time T1 the engine operator rapidly depresses the accelerator pedal from a partially depressed position to its fully depressed position, as shown in FIG. 8a, to demand a step change in gas generator speed, the gas generator speed demand signal (Ngg') at the output of the speed-demand signal generator 32 thus rises, as shown in FIG. 8b, and there is a corresponding rise in the error signal 34S to cause the fuel control circuit 35 to command a more fuel supply, with a resulting increase in the amount of fuel to the engine (wf), as shown in FIG. 8e. With the amount of fuel to the engine increased, there is a rise in the speed of rotation of the gas generator (Ngg), as shown in FIG. 8c, and results in a gradual rise in the speed of rotation of the power turbine (Npt), as shown in FIG. 8d.

As the gas generator speed (Ngg) increases, the modified gas generator speed (Ngg°) increases and there is a small drop in the temperature demand signal 41S, as shown in FIG. 8f, to cause the temperature control circuit 44 to command an increase in variable nozzle opening degree, with a resulting increase in the degree of opening of the variable nozzle 9, as shown in FIG. 8h. With the degree of opening of the variable nozzle 9 increased, there is a drop in the temperature at the inlet of the compressor turbine (Tcc), as shown in FIG. 8g.

Engine surge occurs often in the course of acceleration of the gas generator and the tendency increases as the rate of acceleration of the gas generator increases. At time T2 a surge condition commences during gas generator acceleration, the surge sensor signal 18S has its magnitude vary greatly, as indicated by 18S-1 in FIG. 8a, and the surge control circuit 37 generates a surge control signal 122S, as shown in FIG. 8j, to cause the temperature demand signal to rapidly decrease and then gradually return to its initial level, as shown in FIG. 8f. As a result, the degree of opening of the variable nozzle 9 increases temporarily, as shown in FIG. 8h, to suppress the engine surge.

Upon the generation of the surge control signal 122S, the surge control circuit 37 generates a surge detection signal 132S having a pulse width corresponding to the time period occurrence of the surge control signal 122S, as shown in FIG. 8k. The surge detection signal 132S is applied to the surge indication device 19 which thereby provides an indication whenever the temperature demand signal is modified by the surge control signal 122S.

Since the surge control circuit 37 has a high sensitivity to detect not only small surges but also foreflow conditions toward engine surges, the engine can be controlled to run without surge or at or close to its faint surge level so as to provide the maximum performance without degrading driving feel. Although a typical engine surge during acceleration is depicted in FIG. 8, it is to be understood that the present invention can control engine surge in the same manner during normal engine operating conditions.

Additionally, the surge control circuit 37 detects a failure in the surge sensor 18 and generates a failure indication signal 145S to cause the temperature demand signal generator 41 to reduce the temperature demand signal 41S by a predetermined value so that engine surge will not normally occur. This eliminates the possibility of the engine parts from being subject to failure due to engine surges during acceleration when the surge control circuit 37 fails to control the engine surges because of a failure in the surge sensor 18. The surge control circuit 37 generates a failure detection signal 151S to the failure indication device 20 which provides an indication whenever the temperature demand signal 41S is modified by the failure indication signal 145S to avoid engine surge independent of engine operating conditions.

While the present invention has been described in conjunction with specific embodiments thereof, it is evident that many alternatives, modifications and variations will be apparent to those skilled in the art. Accordingly, it is intended to embrace all alternatives, modifications and variations that fall within the broad scope of the appended claims.

What is claimed is:

1. An apparatus for controlling a gas turbine engine having a gas turbine gas generator including a compressor and a compressor turbine, a separate power turbine driven by said gas generator, and means for adjusting at least one controlled variable which determines a condition of said gas turbine engine, which condition is related to engine surge, comprising:
   (a) a surge sensor sensing the intensity of engine surge;
   (b) an actual signal generator for generating an electrical actual signal indicative of an actual value of said gas turbine engine condition;
   (c) a demand signal generator for generating an electrical demand signal indicative of a demand value of said gas turbine engine condition;
   (d) means for comparing said actual signal with said demand signal to generate an error signal indicative of the difference between said actual and demand values;
   (e) means for calculating a value corresponding to a setting of said controlled variable adjusting means to reduce said error signal to zero;
   (f) a surge detecting circuit for generating a surge detection signal when the sensed surge intensity exceeds a reference level; and
   (g) a control circuit for modifying said demand value based upon said surge detection signal to avoid the engine surge, said control circuit subtracting from said demand value, a control signal that increases at a high rate to a predetermined value and then decreases to its initial value at a low rate.

2. An apparatus for controlling a gas turbine engine having a gas turbine gas generator including a compressor and a compressor turbine, a separate power turbine driven by said gas generator, and means for controlling the fuel flow to said gas generator, comprising:
   (a) a surge sensor for sensing the intensity of engine surge;
   (b) an actual signal generator for generating an electrical actual signal indicative of an actual value of the speed of said gas generator;
   (c) a demand signal generator for generating an electrical demand signal indicative of a demand value of the gas generator speed;
   (d) means for comparing said actual signal with said demand signal to generate an error signal indicative of the difference between said actual and demand values;
   (e) means for calculating a value corresponding to said error signal for controlling the fuel flow to said gas generator to reduce said error signal to zero;
   (f) a surge detecting circuit for generating a surge detection signal when the sensed surge intensity exceeds a reference level; and
   (g) a control circuit for modifying said gas generator speed demand value based upon said surge detection signal to avoid engine surge, said control circuit subtracting, from said gas generator speed demand value, a control signal that increases at a high rate to a predetermined value and then decreases to its initial value at a low rate.

3. An apparatus for controlling a gas turbine engine having a gas turbine gas generator including a compressor and a compressor turbine, a separate power turbine driven by said gas generator, and means for controlling the temperature at the inlet of said compressor turbine, comprising:
   (a) a surge sensor sensing the intensity of engine surge;
   (b) an actual signal generator for generating an electrical actual signal indicative of the temperature at the inlet of said compressor turbine;
   (c) a demand signal generator for generating an electrical demand signal indicative of a demand value of the compressor turbine inlet temperature;
   (d) means for comparing said actual signal with said demand signal to generate an error signal indicative of the difference between said actual and demand values;
   (e) means for calculating a value corresponding to said error signal for controlling the temperature at the inlet of said compressor turbine to reduce said error signal to zero;
   (f) a surge detecting circuit for generating a surge detection signal when the sensed surge intensity exceeds a reference level; and
   (g) a control circuit for modifying said compressor turbine inlet temperature demand value based upon said surge detection signal to avoid engine surge, said control circuit subtracting, from said temperature demand value, a control signal that increases at a high rate to a predetermined value and then decreases to its initial value at a low rate.

4. The apparatus of claim 1, wherein said surge detecting circuit comprises a first comparator for comparing the sensed surge intensity with a background noise level to generate a surge indication signal when said sensed surge intensity exceeds said background noise level, an integrator for integrating said surge indication signal to generate an integrated signal, and a second comparator for comparing said integrated signal with a reference value to generate said surge detection signal and pass said surge detection signal to said control circuit when said integrated signal exceeds the reference value.

5. The apparatus of claim 4, wherein said surge detecting circuit comprises means for reducing said background noise level for a predetermined time period after said surge detection signal occurs.

6. The apparatus of claim 1, which further comprises means responsive to said surge detection signal for providing an indication whenever said control circuit is modifying said demand value based upon said surge detection signal.

7. The apparatus of claim 1, wherein said control circuit comprises a monostable device responsive to said surge detection signal from said surge detecting circuit for generating a pulse signal having a predetermined pulse width, an integrator responsive to the pulse signal from said monostable device for generating said control signal that increases at a high rate to a predetermined value and then decreases at a low rate, and a subtractor for subtracting said control signal from said engine condition demand signal to generate a signal indicative of the difference therebetween.

8. The apparatus of claim 1, which further comprises means for detecting a failure in said surge sensor to generate a failure indication signal, and means responsive to said failure indication signal for modifying said demand signal to avoid engine surge regardless of engine operating conditions.

9. The apparatus of claim 1, which further comprises means for detecting a failure in said surge sensor to generate a failure indication signal, and means responsive to said failure indication signal for providing an indication whenever a failure is detected in said surge sensor.

10. The apparatus of claim 2, wherein said surge detecting circuit comprises a first comparator for comparing the sensed surge intensity with a background noise level to generate a surge indication signal when said sensed surge intensity exceeds said background noise level, an integrator for integrating said surge indication signal to generate an integrated signal, and a second comparator for comparing said integrated signal with a reference value to generate said surge detection signal and pass said surge detection signal to said control circuit when said integrated signal exceeds said reference value.

11. The apparatus of claim 10, wherein said surge detecting circuit comprises means for reducing said background noise level for a predetermined time period after said surge detection signal occurs.

12. The apparatus of claim 2, which further comprises means responsive to said surge detection signal for providing an indication whenever said control circuit is modifying said gas generator speed demand signal based upon said surge detection signal.

13. The apparatus of claim 2, wherein said control circuit comprises a monostable device responsive to said surge detection signal from said surge detecting circuit for generating a pulse signal having a predetermined pulse width, an integrator responsive to the pulse signal from said monostable device for generating said control signal that increases at a high rate to a predetermined value and then decreases at a low rate, and a subtractor for subtracting said control signal from said gas generator speed demand signal to generate a signal indicative of the difference therebetween.

14. The apparatus of claim 2, which further comprises means for detecting a failure in said surge sensor to generate a failure indication signal, and means responsive to said failure indication signal for modifying said gas generator demand signal to avoid engine surge regardless of engine operating conditions.

15. The apparatus of claim 2, which further comprises means for detecting a failure in said surge sensor to generate a failure indication signal, and means responsive to said failure indication signal for providing an indication whenever a failure is detected in said surge sensor.

16. The apparatus of claim 2, wherein said demand signal generator comprises means for generating a signal indicative of the amount of depression of an accelerator pedal, a low-pass filter receiving said accelerator pedal depression indication signal to generate a filtered signal, and means responsive to said filtered signal for generating said gas generator speed demand signal.

17. The apparatus of claim 16, wherein said surge detecting circuit comprises means for detecting a failure in said surge sensor to generate a failure indication signal, and wherein said low-pass filter includes an RC integrator comprised of a capacitor and a series circuit of first and second resistors, and a normally closed switch connected in parallel with said second resistor, said switch opening in response to said failure indication signal.

18. The apparatus of claim 3, wherein said means for controlling the temperature at the inlet of said compressor turbine comprises means for varying the effective area of a gas passage connected between said compressor turbine and said power turbine.

19. The apparatus of claim 3, wherein said surge detecting circuit comprises a first comparator for comparing the sensed surge intensity with a background noise level to generate a surge indication signal when said sensed surge intensity exceeds said background noise level, an integrator for integrating said surge indication signal to generate an integrated signal, and a second comparator for comparing said integrated signal with a reference value to generate a surge detection signal and pass said surge detection signal to said control circuit when said integrated signal exceeds said reference value.

20. The apparatus of claim 14, wherein said surge detecting circuit comprises means for reducing said background noise level to zero for a predetermined time period after said surge detection signal occurs.

21. The apparatus of claim 3, which further comprises means responsive to said surge detection signal for providing an indication whenever said control circuit is modifying said temperature demand signal based upon said surge detection signal.

22. The apparatus of claim 3, wherein said control circuit comprises a monostable device responsive to said surge detection signal from said surge detecting circuit for generating a pulse signal having a predetermined pulse width, an integrator responsive to the pulse signal from said monostable device for generating said control signal that increases at a high rate to a predetermined value and then decreases at a low rate, and a subtractor for subtracting said control signal from said temperature demand signal to generate a signal indicative of the difference therebetween.

23. The apparatus of claim 3, which further comprises means for detecting a failure in said surge sensor to generate a failure indication signal, and means responsive to said failure indication signal for modifying said temperature demand signal to avoid engine surge regardless of engine operating conditions.

24. The apparatus of claim 3, which further comprises means for detecting a failure in said surge sensor to generate a failure indication signal, and means responsive to said failure indication signal for providing an indication whenever a failure is detected in said surge sensor.

25. The apparatus of claim 3, wherein said demand signal generator comprises means for generating an actual speed signal indicative of the speed of rotation of said gas generator, means for generating a signal indicative of the air temperature at the inlet of said gas generator, and means for modifying said gas generator actual speed indication signal based upon said air temperature indication signal to generate a modified signal, means for generating said temperature demand signal as a function describing a relationship between said modified signal and said temperature demand signal.

26. The apparatus of claim 25, wherein said means for generating said temperature demand signal is responsive to said surge detection signal for reducing said temperature demand signal by a predetermined value to avoid engine surge regardless of engine operating conditions.

* * * * *